(No Model.)

J. KRUEGER.
Sheet Metal Cutting and Punching Machine.

No. 242,002. Patented May 24, 1881.

Witnesses:—
Mie Adams
L. E. Everson

Inventor:—
J. Krueger

UNITED STATES PATENT OFFICE.

JULIUS KRUEGER, OF COLUMBUS, WISCONSIN.

SHEET-METAL CUTTING AND PUNCHING MACHINE.

SPECIFICATION forming part of Letters Patent No. 242,002, dated May 24, 1881.

Application filed June 25, 1880. (No model.)

*To all whom it may concern:*

Be it known that I, JULIUS KRUEGER, a citizen of the United States, residing at Columbus, in the county of Columbia and State of Wisconsin, have invented a new and useful Machine for Cutting and Punching Sheet Metal, (which has not been patented to myself, or to others with my knowledge or consent, in any foreign country,) of which the following is a specification.

My invention relates to improvements in punching and shearing machines for the use of tinsmiths, by which a plate of any desired form may be cut and punched with one motion, and adapted to general work in the tin-shop by having interchangeable heads and dies. I attain these objects by the mechanism illustrated in the accompanying drawings, in which—

Figure 1:
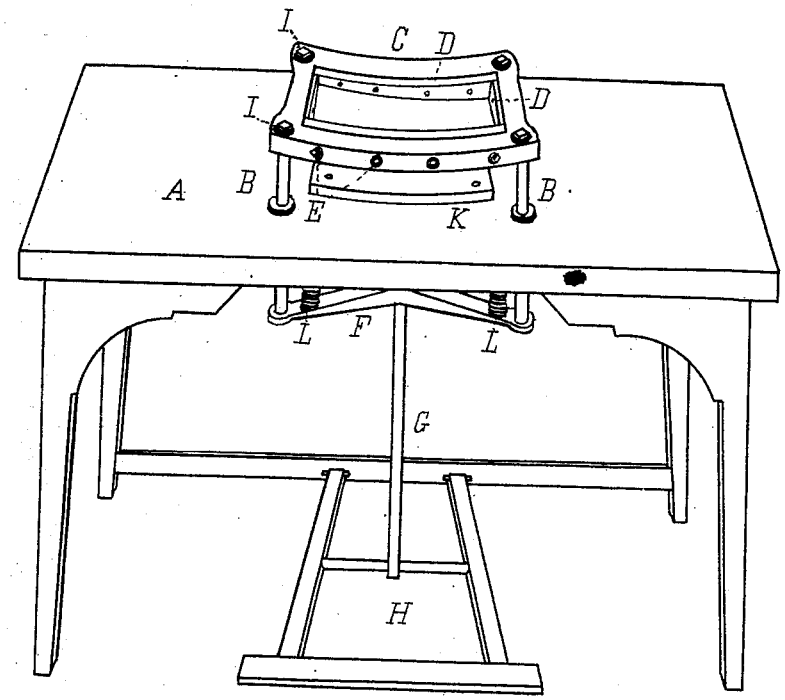
Figure 2:
Figure 3:
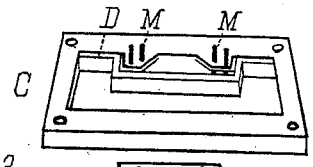
Figure 4:
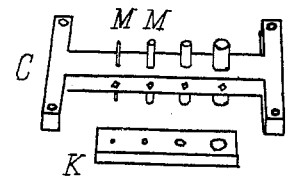

Figure 1 is a perspective view of my entire machine; Fig. 2, a view of a section of a flaring pan; Figs. 3 and 4, views of interchangeable heads.

Similar letters refer to similar parts throughout the several views.

It consists of a table or bench having a heavy strong bed, A, Fig. 1, to which the steel die K, of the form of the piece of sheet metal to be cut, is bolted. Through this bed slide perpendicular rods B B B B, to the upper end of which is attached, by means of nuts I I, a head, C, carrying shearing-knives D D D D, attached to the head by bolts E E. To the lower end of the rods B B is fixed a frame, F, uniting the rods, and to which the treadle H is attached by the rod G. The object of the rods is to equalize the strain of the cutters all around, while the series of springs L L, arranged upon the frame F near the rods B, give an elastic or yielding movement to the cutters or punches when brought down upon the article to be cut or punched, and raise the whole frame.

The shearing-head shown in Fig. 1 is used for cutting a section of a flaring pan shown by Fig. 2.

By removing the nuts I I I I the head C may be removed and one of any desired form may be inserted, such as that shown by Fig. 3, having a shear, D, and punches M M, with which a strip is cut and the holes punched at the same time, or by Fig. 4, a head, C, carrying a gang of punches, M M, or other desirable forms.

The die K is removable and others are inserted to correspond with the head C C, Figs. 3 and 4.

In using the machine it is only necessary to place the piece of tin or other sheet metal to be punched or cut, or both, upon the die and press the treadle down. The pressure being removed from the treadle, the springs L L will raise the head, which is then ready to cut or punch another sheet.

I am aware that a bed provided with a die and a frame carrying similarly-constructed shearing-blades and punches operated through the medium of a treadle is old, and such I do not wish to be understood as claiming broadly as of my invention.

What I claim as my invention, and desire to secure by Letters Patent, is—

The combination, with the bed A, provided with the die K, and the head C, carrying punches or shearing-blades arranged above the bed of the frame F, arranged below the bed, rods B B B B, passing up through said bed and connecting the frame F to the head C, and the series of springs L, arranged upon the frame F near the rods B, and the treadle-connection H G, for operating said frame and head, the several parts arranged relatively to each other, as and for the purpose herein shown and described.

JULIUS KRUEGER.

Witnesses:
 MIC ADAMS,
 L. E. EVERSON.